(12) United States Patent
Muramoto et al.

(10) Patent No.: US 6,980,806 B2
(45) Date of Patent: Dec. 27, 2005

(54) RADIO SYSTEM

(75) Inventors: Mitsuru Muramoto, Tokyo (JP);
Kanemi Sasaki, Tokyo (JP); Yuji Aoyagi, Tokyo (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 589 days.

(21) Appl. No.: 09/813,916

(22) Filed: Mar. 22, 2001

(65) Prior Publication Data
US 2001/0055970 A1 Dec. 27, 2001

(30) Foreign Application Priority Data

Mar. 22, 2000 (JP) .............................. 2000-080054
Oct. 31, 2000 (JP) .............................. 2000-331771

(51) Int. Cl.$^7$ .............................................. H04Q 7/20
(52) U.S. Cl. ...................... 455/446; 455/447; 455/449; 455/422.1
(58) Field of Search .............................. 455/25, 422.1, 455/446, 447, 449, 562.1

(56) References Cited

U.S. PATENT DOCUMENTS 6,275,704 B1 * 8/2001 Dixon ........................ 455/446
6,445,926 B1 * 9/2002 Boch et al. ................. 455/447
6,553,239 B1 * 4/2003 Langston ..................... 343/778

FOREIGN PATENT DOCUMENTS

| JP | B-48-028082 | 8/1973 |
|---|---|---|
| JP | A-60-069923 | 4/1985 |
| JP | A-10-234075 | 2/1998 |
| JP | T-11-504179 | 4/1999 |
| JP | A-2000-059287 | 2/2000 |

OTHER PUBLICATIONS

Webster's II new Riverside University disctionary, p. 551, copy right @1984 by Houghton Mifflin Company.*

* cited by examiner

*Primary Examiner*—Nick Corsaro
*Assistant Examiner*—Sanh Phu
(74) *Attorney, Agent, or Firm*—Jacobson Holman PLLC

(57) ABSTRACT

The present invention is to provide a radio system that enables effective reuse of a limited number of frequencies without the occurrence of interference between subscriber stations. In the radio system according to the present invention, each base station is divided into two or more sectors, each of which is provided with an antenna different in directivity on a horizontal plane. The antennas are so placed that the antenna beams cover all the directions on the horizontal plane as a whole, and all the antennas using the same frequency and polarized wave are so arranged to face in about the same direction.

4 Claims, 12 Drawing Sheets

OVERLAPPED CELL

| F1V | F2V | F1V | F2V |
|-----|-----|-----|-----|
|   (B1)   |   (B2)   |
| F4V | F3V | F4V | F3V |
| F1V | F2V | F1V | F2V |
|   (B3)   |   (B4)   |
| F4V | F3V | F4V | F3V |

FIG.5A

| F2H | F1H | F2H | F1H |
|-----|-----|-----|-----|
|   (B5)   |   (B6)   |
| F3H | F4H | F3H | F4H |
| F2H | F1H | F2H | F1H |
|   (B7)   |   (B8)   |
| F3H | F4H | F3H | F4H |

FIG.5B

| F1V/F2H | F2V/F1H | F1V/F2H | F2V/F1H |
|---------|---------|---------|---------|
|    (B1/B5)    |    (B2/B6)    |
| F4V/F3H | F3V/F4H | F4V/F3H | F3V/F4H |
| F1V/F2H | F2V/F1H | F1V/F2H | F2V/F1H |
|    (B3/B7)    |    (B4/B8)    |
| F4V/F3H | F3V/F4H | F4V/F3H | F3V/F4H |

FIG.5C

RADIO SYSTEM

BACKGROUND OF THE INVENTION

1. Field of the Invention

This invention relates to a radio system that divides its communication area into two or more cells to permit frequency reuse among the cells. In particular, it relates to a radio system for use in communications providing high-speed communication service such as data and image transmission.

2. Description of the Related Art

There are some conventional wireless subscriber lines called WLL (Wireless Local Loop) and FWA (Fixed Wireless Access), LMDS (Local Multipoint Distribution Service). In such subscriber lines, one-to-multi directional radio equipment, called a P-MP (Point-Multi Point) system, is constituted of wireless transmission lines that connect base stations installed by a telecommunications carrier with many subscriber stations installed at users premises.

This system installs two or more base stations in a certain region to provide service in all the parts of the region. In this system, however, frequency reuse is needed for effective utilization of limited frequency resources. Such frequency reuse is common in mobile communication technology for mobile and cellular phones. To prevent the occurrence of interference, the system is also required not only to use different frequencies among all sectors, but to avoid use of the same frequency in adjacent base stations as well.

The above-mentioned P-MP system uses high frequencies of submillimeter or millimeter wave bands to provide communication through the air over line-of-sight distances, which is based on the ARIBSTD-T59 standard. According to the standard, frequency bands of 26 or 38 GHz has to be used, together with the use of high-gain antennas of 20 dBi or more at subscriber stations.

A cell configuration in a conventional P-MP system is disclosed in Japanese Patent Application Laid-open No. 10-042352 entitled. Radio System. (Applicant: Mitsubishi Electric Corp., Inventor: Koichi Ishii) published on Feb. 13, 1998. A typical sector configuration will be described below.

FIG. 10 is a plan view of a conventional layout of base stations, showing a case when subscriber stations face each other and thereby cause interference.

In FIG. 10, B1 to B6 are base stations and F1 to F3 are frequencies F1 to F3 used at each antenna, indicating each base-station area in the form of a hexagon for convenience sake. This configuration is effective in an FDD system using different transmit frequencies between the base stations and terminal stations (subscriber stations).

On the other hand, a TDD system using the same transmit frequencies between the base stations and the terminal stations may cause some subscriber stations to face each other. In this case, great interference occurs and high-quality service cannot be offered.

In general, the P-MP system is not designed for synchronization between the base stations. Therefore, in FIG. 10, interference occurs between subscriber stations C1 and C2 (which commonly use frequency F3) and subscriber stations C3 and C4 (which commonly use frequency F2).

If there is no synchronization between sectors, interference also occurs between subscriber stations C5 and C6 (which commonly use frequency F2) within the same base-station area.

Description will be made next about the above-mentioned problems with reference to FIGS. 10 through 12, taking as an example the conventional case of interference between subscriber stations C1 and C2.

FIG. 11 is an elevation view showing the position of a base station and subscriber stations for calculating the amount of interference in the conventional layout of the base stations.

Suppose that transmission power of the base station and the subscriber stations is 17 dBm, the antenna gain at the base station is 15 dBi, and the antenna gain at the subscriber stations is 30 dBi.

In general, a parabola antenna with a gain of 30 dBi radiates a beam of about three to four degrees in width.

Suppose further that the service area of the base station is 1 km, the distance of the base station B1 to the subscriber station C1, and the base station B6 to the subscriber station C2 is 1 km, and the distance of the subscriber stations C1 and C2 is 8 km.

In addition, installation of antennas are made the same in height between the base stations B1 and B6, and between the subscriber stations C1 and C2, respectively, for the sake of simplicity.

The elevation angle of the antenna that the subscriber station allows for the base station depends on the difference of elevation between the base station and the subscriber station. If the difference of elevation is 30 m, the elevation angle will be about 1.7 deg. This elevation angle is just one-half the beam width of the antenna or less, and therefore, the gain of the antenna at the subscriber station C2 toward the subscriber station C1 is made only about 3 dB lower than the maximum gain.

The level of a desired wave to be transmitted from the base station B1 and reach the subscriber station C1 can be determined by the following equation: transmission output+transmitting antenna gain−on-air attenuation+receiving antenna gain.

That is, 17+15.120+30=−58 dBm.

On the other hand, the level of an interference wave to be transmitted from the subscriber station C2 and reach the subscriber station C1 would be 17+27.139+27=−68 dBm.

It is preferable, though it depends on the apparatus used, that the ratio of the desired wave to the interference wave (DU ratio:Duty Factor Ratio) is at least 20 dB or more. However, the above DU ratio calculated is just 10 dB and apparently insufficient for high-quality communication.

It is also easy to understand that, since interference between the subscriber stations C3 and C4, and between the subscriber stations C5 and C6 occurs at a distance closer to the occurrence of interference between the subscriber stations C1 and C2, the levels of these interference waves become greater.

FIG. 12 is a plan view showing a conventional layout of a base station, indicating a case when subscriber stations face each other and thereby cause interference.

As shown in FIG. 12, if the number of sectors at each base station is four, subscriber stations may face each other between adjacent cells. In this case, the interference also becomes greater because the subscriber stations C1 and C2 are located close to each other.

It is hard for the conventional radio systems to prevent the occurrence of interference between subscriber stations facing each other. The position of the subscriber stations facing each other may not cause a big problem in an FDD (Frequency Division Duplex) system that uses different frequencies for transmission and reception. However, it may cause a big problem in a TDD (Time Division Duplex) system that uses the same frequency for transmission and reception. For example, if the subscriber stations communicating at the same frequency face each other in the TDD system, a serious interference problem will occur.

SUMMARY OF THE INVENTION

It is an object of the present invention to provide a radio system that allows effective reuse of limited frequency bands even in a TDD system without the occurrence of interference between subscriber stations.

According to one aspect of the present invention, there is provided a radio system that divides a certain region into two or more cells and installs a base station at about the center of each cell to carry out communication between the base station and many fixed terminal stations in the cell in which the base station is installed, wherein each base station is divided into two or more sectors, each of which is provided with an antenna different in directivity on a horizontal plane, the antennas are so placed that the antenna beams cover all the directions on the horizontal plane as a whole, and all the antennas using the same frequency and the same polarized wave are so arranged to face in about the same direction. This configuration is particularly effective in a case when each base station is divided into n sectors (where n is an integer of three or more).

According to another aspect of the present invention, there is provided a radio system that divides a certain region into two or more cells and installs a base station at about the center of each cell to carry out communication between the base station and many fixed terminal stations in the cell in which the base station is installed, wherein each base station is divided into n sectors (where n is an integer of four or more), each of which is provided with an antenna different in directivity on a horizontal plane, the antennas are so placed that the antenna beams cover all the directions on the horizontal plane as a whole, and two or more antennas using the same frequency and the same polarized wave are brought together as an antenna group to arrange all the antenna groups using the same frequency and polarization to face in about the same direction. This configuration is particularly effective in a case when each base station is divided into n sectors (where n is an integer of four or more).

The above-mentioned radio systems, which offer service in almost all the parts of the certain region using only one type of polarized wave, may further install base stations using another type of polarized wave in the existing service area. This configuration allows additional installation of base stations varied in polarization.

In the above-mentioned radio systems, all the sectors at each base station may use the same frequency but two types of polarized waves together.

In the above-mentioned radio systems, the number of sectors at each base station and assignment of frequencies used and polarized waves may correspond to those at adjacent base stations. This configuration makes it possible to operate the base stations more efficiently.

Further, the above-mentioned radio systems may use a TDD system. This configuration is particularly effective in the TDD system.

According to still another aspect of the present invention, there is provided a radio communication system that divides a certain region into two or more cells and installs a base station in each cell to carry out communication between the base station and many fixed terminal stations in the cell in which the base station is installed, wherein the base station is installed near the edge of the cell, all the antennas at the base station are made possible communication throughout the same range of the horizontal direction and placed to face in the same direction, and adjacent cells use different frequencies or different polarized wave for radio communication. This configuration not only prevents the occurrence of interference between base stations, but also save the utilization of frequency resources.

According to yet another aspect of the present invention, there is provided a radio system that divides a certain region into two or more cells and installs a base station in each cell to carry out communication between the base station and many fixed terminal stations in the cell in which the base station is installed, wherein the base station is installed near the edge of the cell, each cell is divided into two or more sectors, each of which is provided with an antenna, all the antennas at the base station are made possible communication throughout the same range of the horizontal direction, and placed not to face the other base stations, and adjacent cells use different frequencies or different polarized waves for radio communication. This configuration not only prevents the occurrence of interference between base stations and between subscriber stations, but also save the utilization of frequency resources.

BRIEF DESCRIPTION OF THE DRAWINGS

By way of example and to make the description more clear, reference is made to the accompanying drawings in which:

FIG. 2 consists of plan views showing the position of a subscriber station and adjacent base stations when interference occurs between them in the radio system according to the first embodiment of the present invention, in which

FIG. 3 consists of graphs showing antenna patterns for explaining how to avoid interference between the subscriber station and the adjacent base stations in the radio system according to the first embodiment of the present invention, in which

FIG. 5 consists of plan views showing layouts of base stations in a radio system according to a third embodiment of the present invention, in which FIG. 5A is a diagram showing a case when only a vertically polarized wave is used to provide service based on the first embodiment, FIG. 5B is a diagram showing a cell configuration using the same frequency but different polarized waves in the existing service areas, and FIG. 5C is a diagram showing a cell configuration in which FIG. 5B is overlapped upon FIG. 5A;

FIG. 7 consists of plan views showing layouts of base stations in a radio system according to a fourth embodiment of the present invention, in which

DESCRIPTION OF REFERENCE NUMERALS

B1 to B8. Base Station, C1 to C6. Subscriber (Terminal) Station, F1 to F4. Frequency Used, F1V to F4V. Frequency Used for Vertically Polarized Wave, F1H to F8H. Frequency Used for Horizontally Polarized Wave.

DESCRIPTION OF THE PREFERRED EMBODIMENT

The following describes preferred embodiments according to the present invention with reference to the accompanying drawings.

Figure 1:
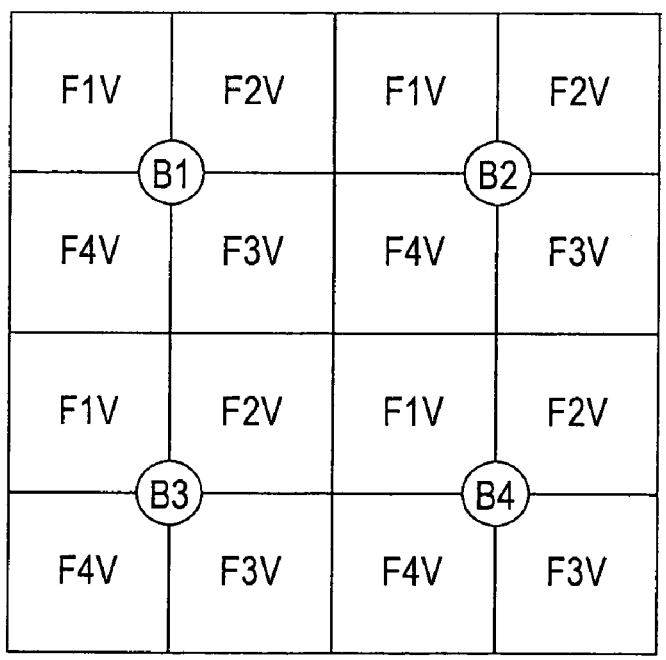
FIG. 1 is a plan view showing a layout of base stations in a radio system according to a first embodiment of the present invention.
Figure 1:
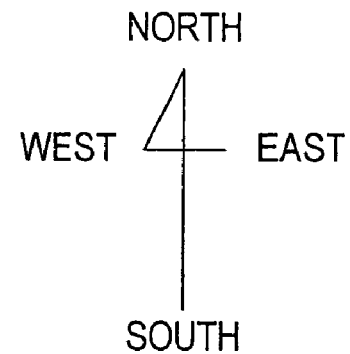

Referring first to FIG. 1, description will be made about a radio system according to the first embodiment of the present invention. FIG. 1 is a plan view showing a layout of base stations in the radio system according to the first embodiment of the present invention, indicating an service area of each base station and a frequency used for each sector. In FIG. 1, B1 to B4 are base stations and F1V to F4V are frequencies used, where V indicates the use of vertical polarized waves.

According to the present invention, antennas for all sectors using the same frequency and the same polarized wave are arranged to face in about the same direction.

As shown, if north is taken in the upper direction, all antennas at the base stations using, for example, a frequency of F1 will be placed to face northwest. Similarly, all antennas at the base stations using a frequency band of F2, F3 or F4 are placed to face northeast, southeast, or southwest, respectively.

In other words, base stations using the same frequency can never face each other, and therefore interference due to the use of the same frequency seldom occurs among the base stations.

Further, since subscriber stations are aimed at the base station concerned, the subscriber stations using frequency F1 direct their antennas in a direction between the south and the east, that is, the antennas never face in the other directions. It is apparent from this fact that antennas at the subscriber stations using the same frequency can never be placed to face each other. The same thing takes place to the other subscriber stations using frequency F2, F3 or F4.

Since the subscriber stations using the same frequency can never face each other, interference between the subscriber stations due to the use of the same frequency seldom occurs.

Figure 2A:
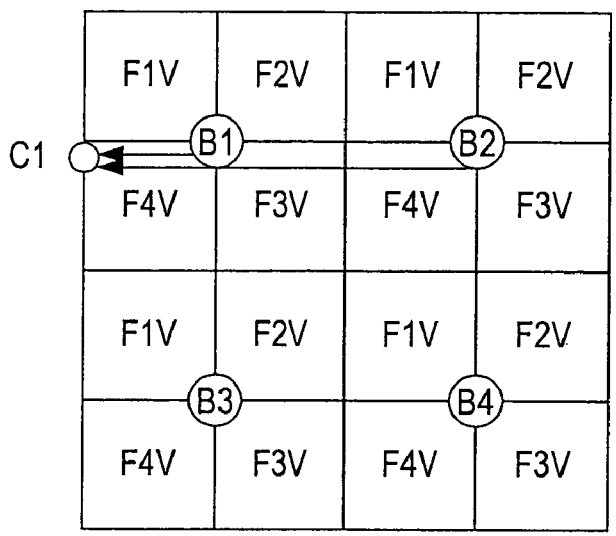
FIG. 2A is a diagram showing interference given by the subscriber station to the adjacent base stations or by the adjacent base stations to the subscriber station.
Figure 2B:
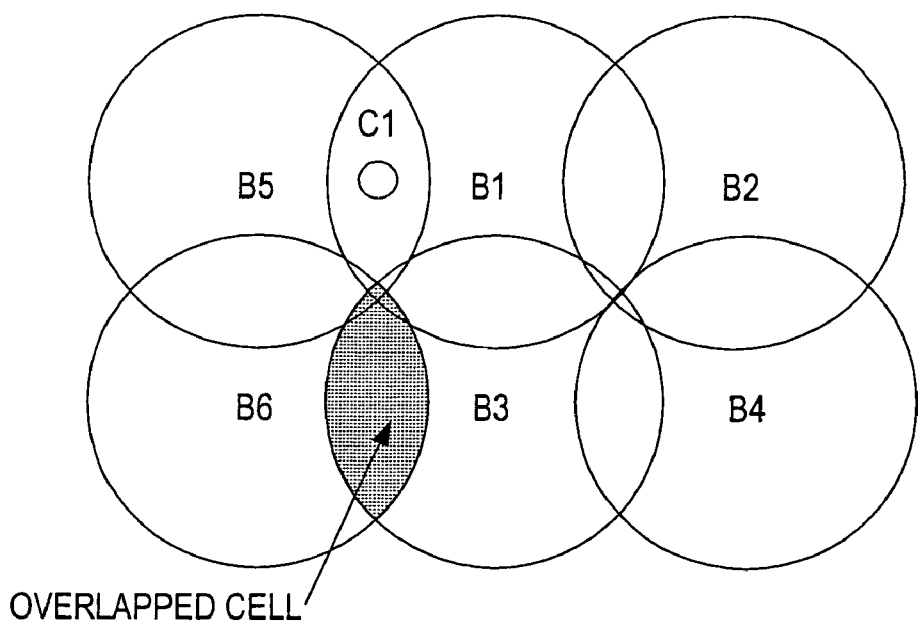
FIG. 2B is a diagram showing actual service areas approximately circular in form with each base station at the center.
Figure 2C:
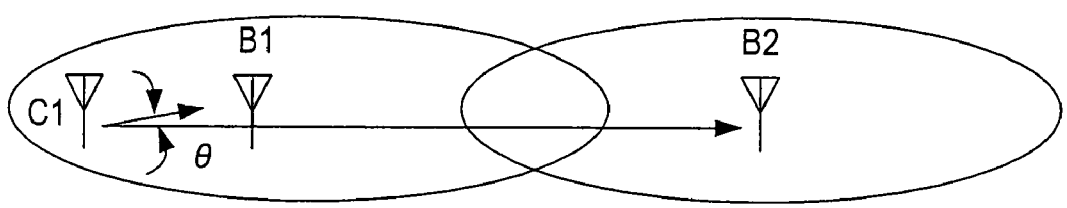
FIG. 2C is a diagram showing an example of the position of the base stations and the subscriber station between which interference occurs.

FIG. 2 consists of plan views showing the position of a subscriber station and adjacent base stations when interference occurs between them in the radio system according to the first embodiment of the present invention. FIG. 2A is a diagram showing interference given by the subscriber station to the adjacent base stations or by the adjacent base stations to the subscriber station. FIG. 2B is a diagram showing actual service areas approximately circular in form with each base station at the center. FIG. 2C is a diagram showing an example of the position of the base stations and the subscriber station between which interference occurs.

When the base stations are arranged as in FIG. 1, what is expected is interference given by the subscriber station to the adjacent base stations or by the adjacent base stations to the subscriber station. This kind of interference occurs when two base stations fall in a beam width of the antenna at the subscriber station.

In general, since base stations are installed at high elevations, when the subscriber station is approaching a base station, the antenna at the subscriber station points above (with an elevation angle) without pointing at adjacent base stations. It is easy to understand that, if interference occurs, the subscriber is likely to be located near the area boundary between adjacent base stations.

FIGS. 1 and 2A show the areas of the base stations in the form of a square for convenience sake, but actual areas are approximately circular in form with each base station at the center. Therefore, there exist portions overlapping cells one upon another as shown, which are called overlapped cells or overlapped zones.

Radio systems for cellular phones and the like take the advantage of the overlapped cells, which allow the cellular phones to communicate with two or more base stations, to perform hand-over processing for switching to a base station the subscriber station is to be connected next.

As described above, interference mostly occurs when the subscriber station is approaching the area boundary between adjacent base stations, which also means it mostly occurs when the subscriber station is in an overlapped zone.

In other words, if the subscriber station C1 communicating with a base station B1 interferes with a base station B2, the subscriber station C1 can change its communication partner to a base station B5 to avoid the interference with the base station B2.

FIG. 2C shows an example of the position of the subscriber station and the base stations between which interference occurs. It is easy to guess that the subscriber station is unlikely to be in range with the two base stations, and in most case, the subscriber station is off at some angle 6 from the base stations.

Figure 3A:
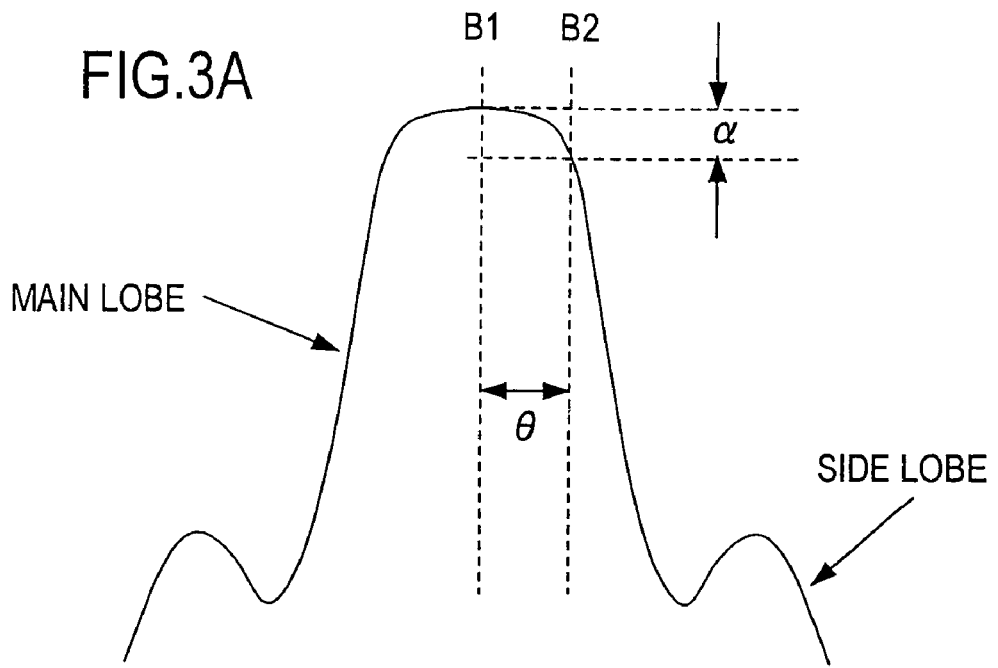
FIG. 3A is a graph showing a radiation pattern of an antenna at subscriber station C1 with main and side lobes when the antenna is so installed that the level at base station B1 becomes higher than that at the subscriber station C1.

In general, the radiation pattern of the antenna contains main and side lobes as shown in FIG. 3A to be described below. Further, the antenna at the subscriber station C1 is so installed that the level at the base station B1 becomes higher.

Figure 3B:
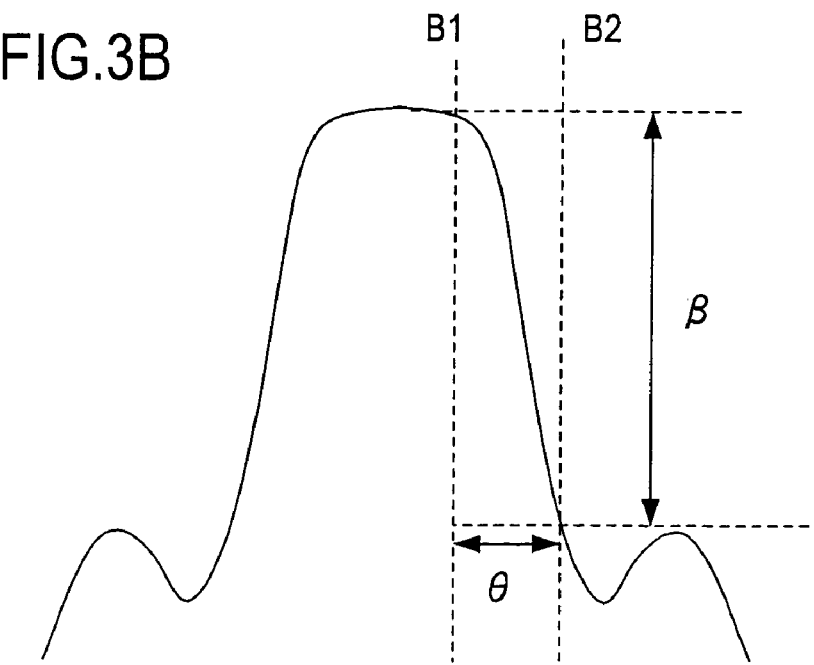
FIG. 3B is a graph showing a case when the direction of the antenna at the subscriber station C1 is adjusted.

FIG. 3 consists of graphs showing antenna patterns for explaining how to avoid interference between the subscriber station and the adjacent base stations in the radio system according to the first embodiment of the present invention. FIG. 3A is a graph showing a radiation pattern of the antenna at the subscriber station C1 with main and side lobes when the subscriber station C1 is so installed that the level at the base station B1 becomes higher than that at the subscriber station C1. FIG. 3B is a graph showing a case when the direction of the antenna at the subscriber station C1 is further adjusted.

In FIG. 3A, the direction of the subscriber station C1 toward the base station B2 that interferes with the subscriber station C1 is off at an angle θ from the direction of the base station 31. As a result, a gain of α is reduced from that of the antenna at the subscriber station C1 in the direction of the base station B2. Suppose here that the direction of the antenna at the subscriber station C1 is adjusted as shown in FIG. 3B. In this case, the gain in the direction of the base station 31 is somewhat reduced, but the difference of gain β from that in the direction of the base station B2 can be considerably reduced (β>α). Since this kind of adjustment can be applied both horizontally and vertically, it is effective unless the subscriber station C1 and the base station B2 are in range with each other three-dimensionally.

Figure 4:
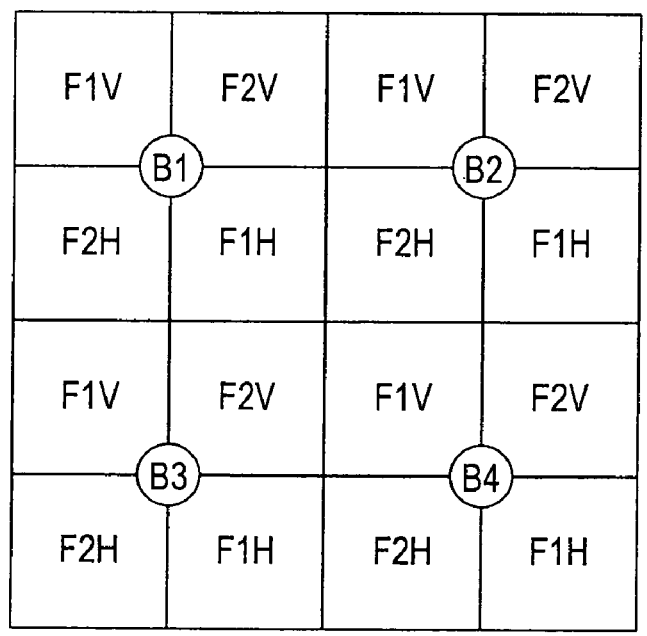
FIG. 4 is a plan view showing a layout of base stations in a radio system according to a second embodiment of the present invention.
Figure 4:
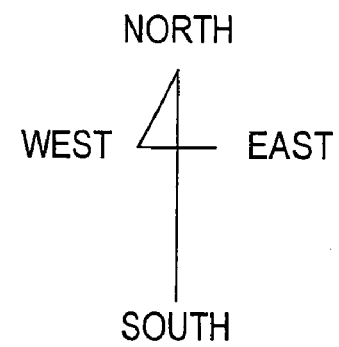

FIG. 4 is a plan view showing a layout of base stations in a radio system according to the second embodiment of the present invention.

In FIG. 4, B1 to B4 are base stations, numerals following F denote frequencies used, and V or H following each numeral denotes the use of a vertically or horizontally polarized wave, respectively.

For example, all antennas at base stations using a vertically polarized wave at frequency F1 are arranged to face northwest. In other words, the base stations using the same frequency and the same polarized wave can never face each other, and therefore no interference occurs between the base stations as long as they have the ability to discriminate cross polarization of the antennas.

Further, since subscriber stations is aimed at the base station concerned, the subscriber stations using frequency F1 direct their antennas in a direction between the south and the east, that is, the antennas never face in the other directions.

It is apparent from this fact that antennas at the subscriber stations using the same frequency and the same polarized wave can never be placed to face each other, and hence, no interference occurs between the subscriber stations.

Although interference may be given by a subscriber station to adjacent base stations or by the adjacent base stations to the subscriber station, the same method of avoiding the interference as in the first embodiment can be applied to this case.

Thus the second embodiment allows reuse of two types of frequency to configure all the areas covering a certain region, which makes possible extremely economic utilization of frequency resources. Of course, three or more frequencies can be reused, or the number of sectors can be increased within the scope of the present invention.

Further, in actual practice, it may be difficult to arrange the base stations at equal spaces due to severe location requirements, but it is apparent that the present invention is applicable to any cases regardless of whether or not the base stations are arranged at equal spaces.

FIG. 5 consists of plan views showing layouts of base stations in a radio system according to the third embodiment of the present invention. FIG. 5A is a diagram showing a case when only a vertically polarized wave is used to provide service based on the first embodiment. FIG. 5B is a diagram showing a cell configuration using the same frequency but different polarized waves in the existing service areas. FIG. 5C is a diagram showing a cell configuration in which FIG. 5B is overlapped upon FIG. 5A.

In general, frequencies of submillimeter or millimeter wave bands tend to be attenuated under the influence of rain. The magnitude of attenuation due to the rain varies depending on the polarization of the wave, that is, attenuation of the horizontally polarized wave becomes greater than that of the vertically polarized wave. Therefore, if the influence of rain is taken into account, such a cell configuration as to use the vertically and horizontally polarized waves together is not always preferable.

It is nevertheless desirable to use both polarized waves in terms of effective utilization of frequencies. The first and second embodiments according to the present invention can further be improved to provide a radio system that can meet both conflicting expectations.

Suppose here that only the vertical polarized wave is used to provide service based on the first embodiment as shown in FIG. 5A. If a base station or stations need to be increased in the existing service area due to an increase in the number of subscribers or the like, and no other frequencies are available, the base stations can be additionally installed in the existing service area by configuring additional cells as shown in FIG. 5B to use the same frequency but a different polarized wave (horizontal polarized wave in this case).

FIG. 5C is a diagram showing a cell configuration in which FIG. 5B is overlapped upon FIG. 5A, indicating frequencies and polarized waves used at all the base stations after the installation of some additional base stations. It is apparent from FIG. 5C that base stations can be additionally installed without the occurrence of interference due to subscriber stations facing each other.

As apparent from a comparison between FIGS. 5A and 5B, in the third embodiment the position of F1 and F2, and F3 and F4 are replaced with each other to prevent the use of the same frequency in the same area. However, the frequencies may be replaced in a way different from that of FIG. 5B, or the frequencies may not need to be replaced if the base stations have an enough cross-polarization ratio.

Further, the third embodiment showed the case where additional base stations are installed at about the same location as the existing base stations, but they may be installed with separation from the existing base stations.

Furthermore, the third embodiment described how to increase base stations using the horizontally polarized wave in the service area of the vertically polarized wave, but the vertically and horizontally polarized waves may be in inverse relation to each other. Furthermore, base stations using vertically and horizontally polarized waves may be mixed in the initial configuration so that their order of installation can be replaced.

Figure 6:
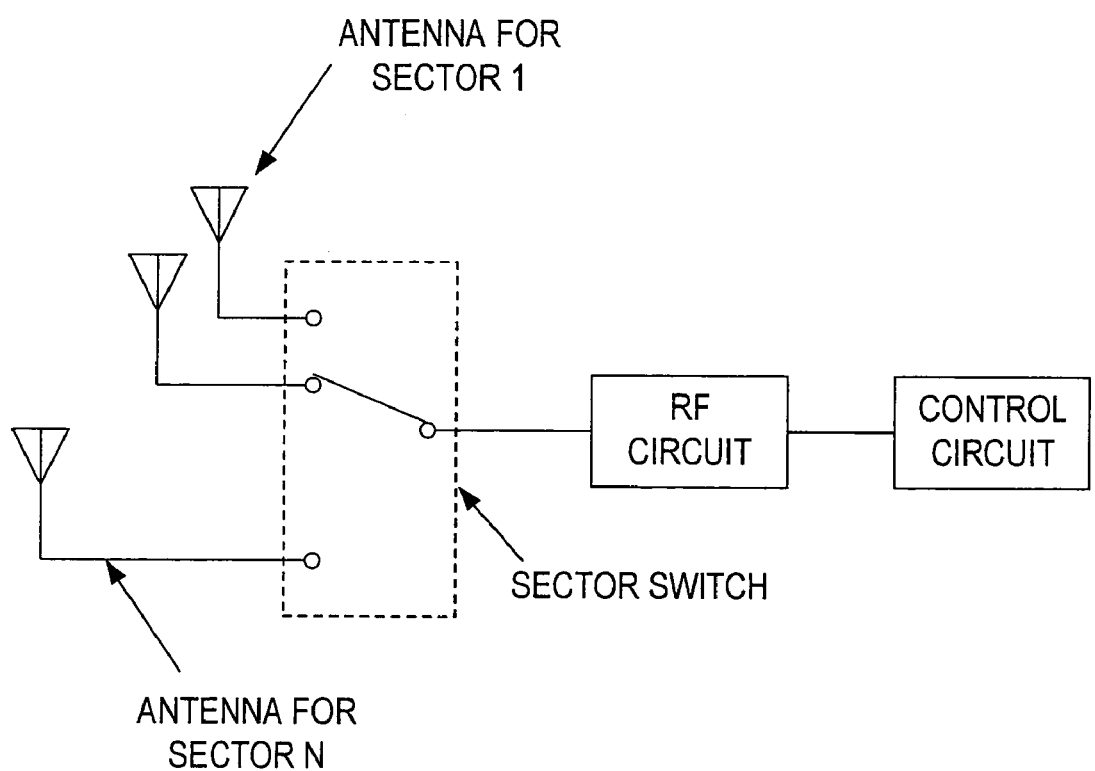
FIG. 6 is a block diagram for explaining a time-sharing system that switches sectors to be used.

FIG. 6 is a block diagram for explaining a time-sharing system that switches sectors to be used. In other words, it shows a system that divides a base station into two or more sectors and time-shares the sectors by means of a sector switch.

In such a system, even if two or more antennas use the same frequency and the same polarized wave, none of the antennas receives or transmits waves at the same time. Therefore, all the sectors using the same frequency and the same polarized wave do not need to direct their antennas in the same direction.

Such a system as to time-share the sectors will be described below as the fourth embodiment of the present invention.

Figure 7A:
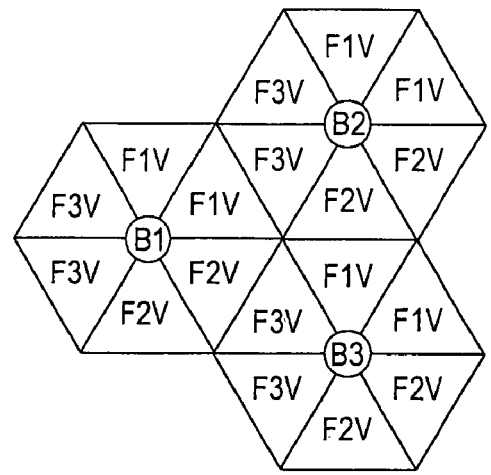
FIG. 7A is a diagram showing a system that time-shares sectors.
Figure 7B:
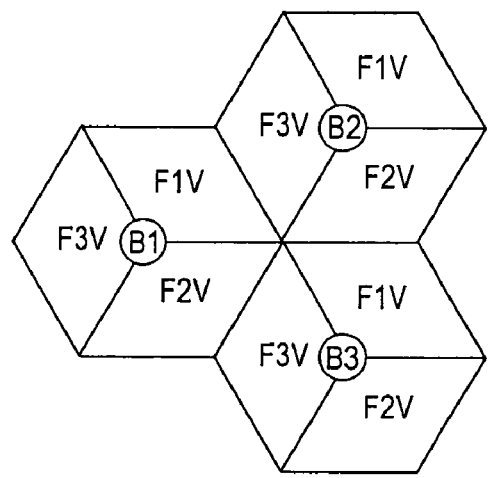
FIG. 7B is a diagram showing a case when antennas using the same frequency and the same polarized wave are brought together as an antenna group.
Figure 7C:
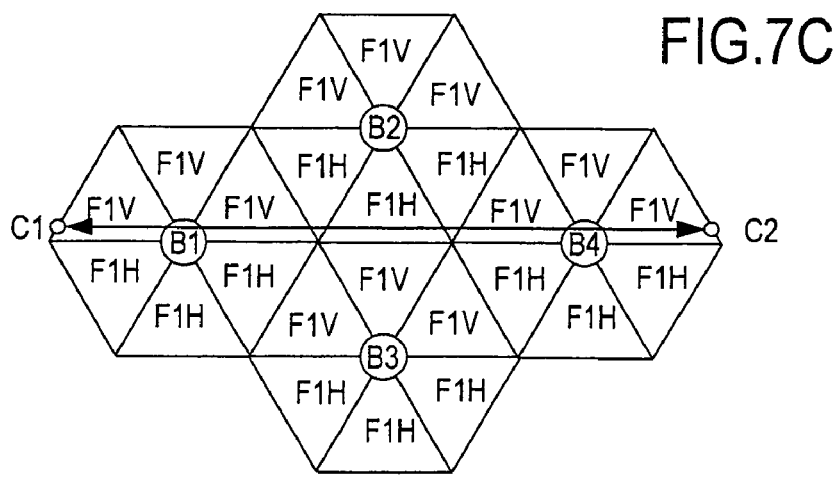
FIG. 7C is a diagram showing a modification of the embodiment in which a base station uses only one frequency.

FIG. 7 consists of plan views showing layouts of base stations in a radio system according to the fourth embodiment of the present invention. FIG. 7A is a diagram showing a system that time-shares sectors. FIG. 7B is a diagram showing a case when antennas using the same frequency and the same polarized wave are brought together as an antenna group. FIG. 7C is a diagram showing a modification of the embodiment in which a base station uses only one frequency.

As shown, since two antennas use the same frequency and the same polarized wave, not all the sector antennas face in the same direction. In this case, however, antennas using the same frequency and the same polarized wave can be collectively considered an antenna group, and hence represented as shown in FIG. 7B. Thus the fourth embodiment can be considered in the same way as in the above-mentioned first to third embodiments.

FIG. 7C shows a modification of the embodiment in which a base station uses only one frequency. Here, if the radio system uses the TDD system, there may be a case where subscriber stations like C1 and C2 face each other to cause great interference.

However, if the frequency can vary at each base station, separations of frequency reuse between base stations using the same frequency can be widened enough to avoid the interference.

It should be noted that in the FDD system no interference problem occurs between subscriber stations. Therefore, this embodiment is effective in the FDD system in constructing such a cheap system as to use only one frequency at a base station.

The above-mentioned embodiments described the cases where the base station was of four- or six-sector structure, but the present invention is, of course, applicable to some number of sectors other than four or six.

Further, the above-mentioned embodiments showed the cell configurations that allowed less use of limited frequency resources to cover a certain region as a service area. But, if more frequencies are available, the use of more frequencies is effectively carried out by widening separations of frequency reuse between base stations using the same frequency.

The present invention can solve such a problem that conventional cell configurations cannot be used in the TDD system because subscriber stations face each other. Therefore, the present invention is particularly effective in radio systems using TDD.

On the other hand, the cell configurations according to the present invention prevent base stations and subscriber stations using the same frequency and the same polarized wave from facing each other, which is also applicable to radio systems using FDD.

Figure 8:
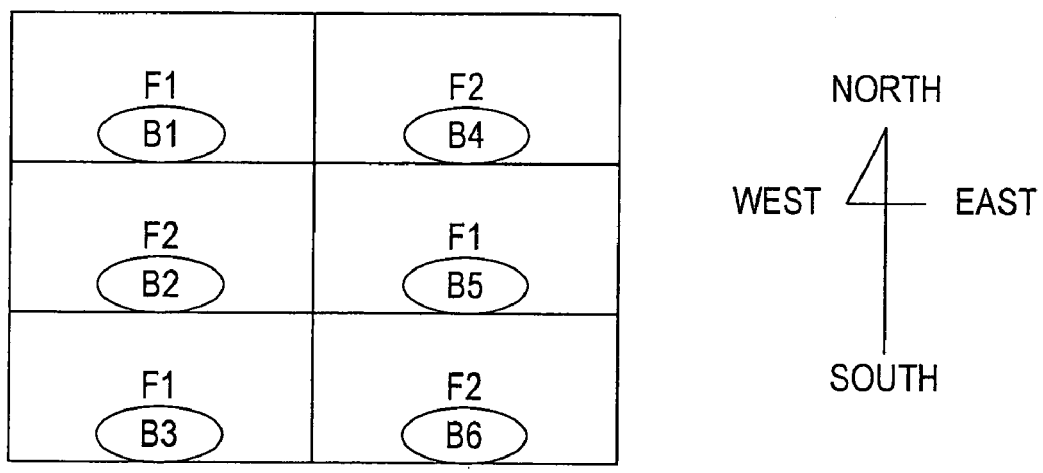
FIG. 8 is a plan view showing a cell configuration in a radio communication system according to a fifth embodiment of the present invention.

Description will be made next about a configuration of a radio communication system according to the fifth embodiment of the present invention with reference to FIG. 8. FIG. 8 is a plan view of a cell configuration in a radio communication system according to the fifth embodiment of the present invention. In FIG. 8, B1 to B6 are base stations and F1 to F2 are frequencies used.

The radio communication system according to the fifth embodiment of the present invention is such that all the base-station antennas are placed to face north to cover the northern 180-degree area. Each base station is then installed in the south-end center.

Taking base station B1 as an example, the cell covered by the base station B1 uses frequency F1 for communication. Then, the antenna at the base station B1 is placed to face north for two-way communication with subscriber stations in the cell. The other base stations consist of the same arrangement as the base station B1 except for the frequency used. As a result, no base-station antennas face each other, and hence no interference between base stations occurs.

In the radio communication system according to the fifth embodiment of the present invention, the direction of all the base-station antennas is not limited to the north, and it may be any other directions.

On the other hand, any subscriber station in the cell directs its antenna in such a direction as to enable two-way communication with the base station as the communication partner. For example, a subscriber station in the cell directs its antenna in the west-to-east direction via the south for two-way communication with the base station as the communication partner. The subscriber station doesn't face in the opposite direction, that is, in the west-to-east direction via the north.

As an example of a case when subscriber stations face each other in the cell configuration of FIG. 8, assuming that subscriber stations are placed west and east, respectively, on opposite sides of the base station. In this case, interference may occur between the subscriber stations, but because of relative gain characteristics of the parabola antenna, the antennas can be moved at about two degrees from the current direction to reduce the current gain value by about 10 dB. Using this characteristic, the subscriber stations can escape from facing each other in the cell, thus avoiding the occurrence of interference between them.

Further, in the cell configuration of FIG. 8, adjacent cells use different frequencies. For example, the base station B1 uses the frequency F1, whereas adjacent base stations B2 and B4 use frequency band F2. Such a cell configuration makes it possible to reduce the occurrence of interference between subscriber stations belonging to different cells. In particular, the more the types of frequency used, the more the combination of frequencies used in each cell will be. This can further reduce the occurrence of interference.

The radio communication system according to the fifth embodiment of the present invention can use any combination of frequencies used at each base station as long as the cell configuration prohibits adjacent cells from using the same frequency.

Further, the radio communication system according to the fifth embodiment of the present invention is applicable regardless of the radio communication method, the number of base stations, and the types of frequencies used.

According to the fifth embodiment of the present invention, the radio communication system is such that all the base stations cover the 180-degree area in a certain direction and their antennas are placed to face in the certain direction. On the other hand, the subscriber-station antennas are placed to point at the base-station antenna in the cell to which the subscriber stations belong. Further, the same frequency is reused among all but the base stations in adjacent cells. Thus, the radio communication system can prevent the occurrence of interference between base stations, and reduce the occurrence of interference between subscriber stations, thereby offering high-quality communication service while saving the utilization of frequency resources.

Figure 9:
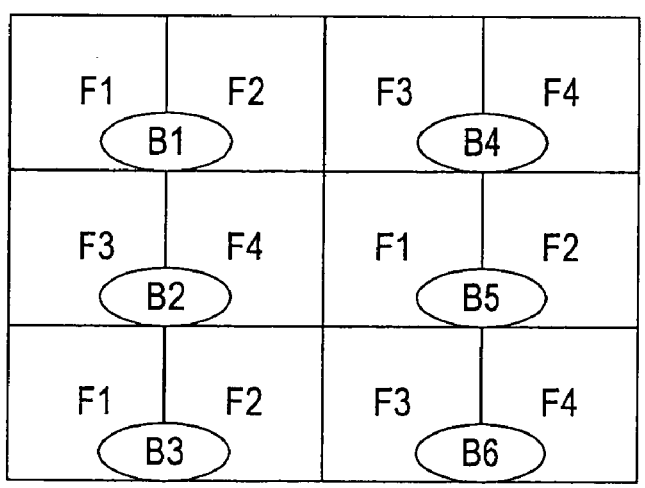
FIG. 9 is a plan view showing a cell configuration in a radio communication system according to a sixth embodiment of the present invention.
Figure 9:
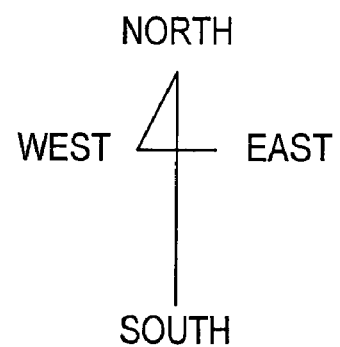
Figure 10:
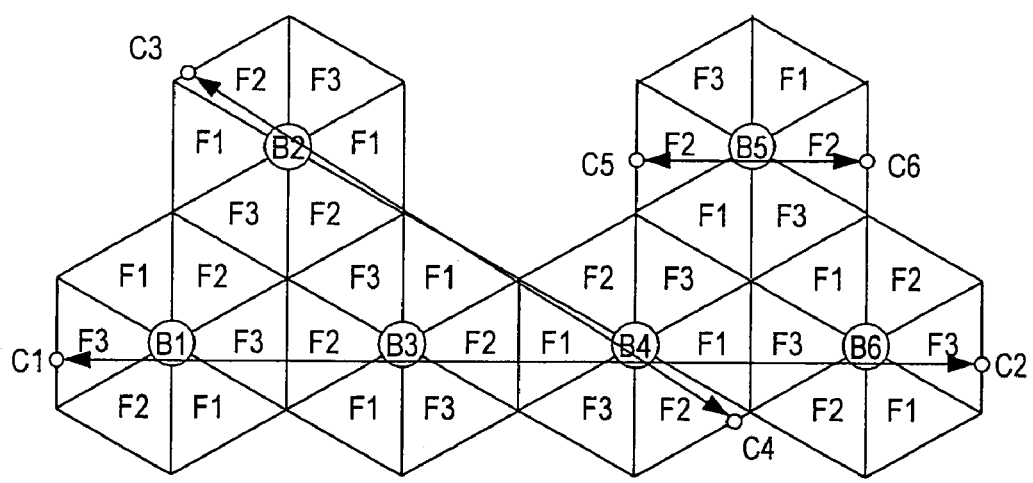
FIG. 10 is a plan view showing a conventional layout of base stations, indicating a case when subscriber stations face each other and thereby cause interference.
Figure 11:
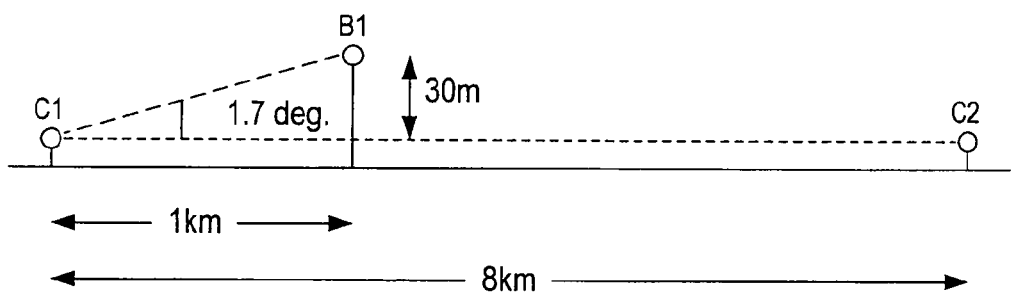
FIG. 11 is an elevation view showing a base station and subscriber stations for calculating the amount of interference in the conventional layout of the base stations.
Figure 12:
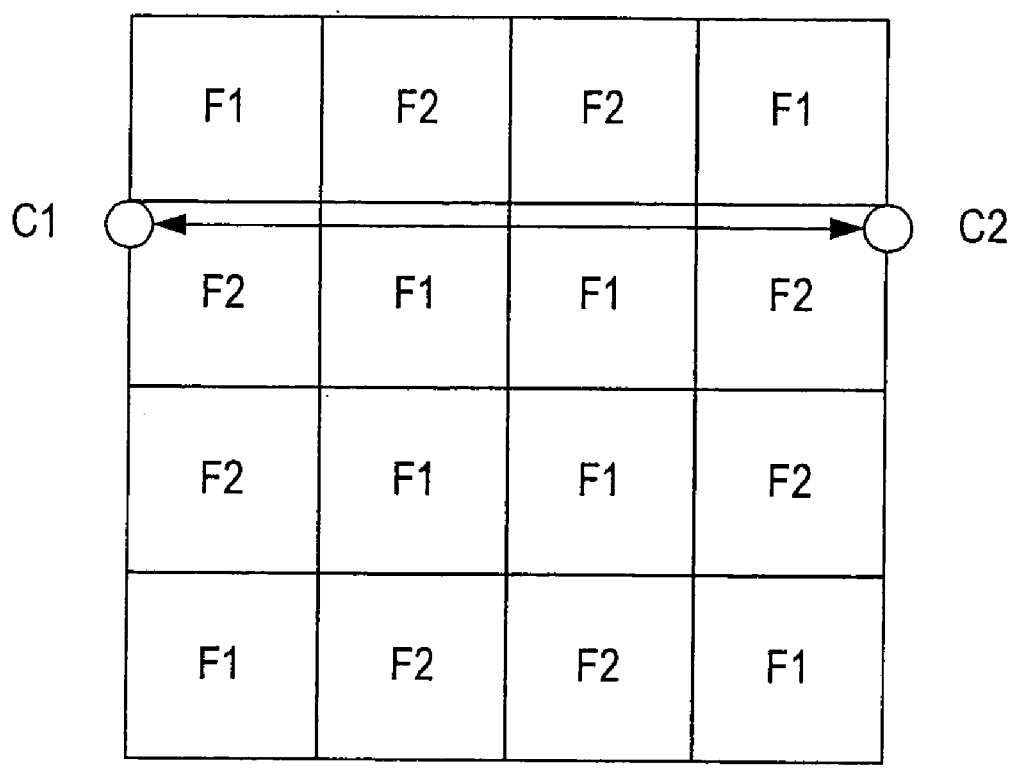
FIG. 12 is a plan view showing a conventional layout of a base station, indicating a case when subscriber stations face each other and thereby cause interference.

Description will be made next about a radio communication system according to the sixth embodiment of the present invention with reference to FIG. 9. FIG. 9 is a plan view of a cell configuration in a radio communication system according to the sixth embodiment of the present invention. In FIG. 9, B1 to B6 are base stations and F1 to F4 are frequencies used.

The radio communication system according to the sixth embodiment of the present invention is such that each cell is divided into two sectors for the east and the west, respectively. The antennas for the west sector are placed to face northwest and those for the east sector are placed to face northeast, so that all the base-station antennas cover the northern 18-degree area. Each base station is then installed in the south-end center.

Taking base station B1 as an example, the cell covered by the base station B1 is divided into two sectors for the west and the east, respectively. Frequencies F1 and F2 are used for the respective sectors as communication frequencies. The base station B1 sets the antenna for the west sector to the northwest and the antenna for the east sector to the northeast for two-way communication with subscriber stations in each sector. The other base stations consist of the same arrangement as the base station B1 except for the frequency used. As a result, no base-station antennas face each other, and hence no interference between base stations occurs.

In the radio communication system according to the sixth embodiment of the present invention, the direction of all the base-station antennas is not limited to the north, and it may be any other directions.

On the other hand, any subscriber station in each sector directs its antenna in such a direction as to enable two-way communication with the base station as the communication partner. For example, a subscriber station in the west sector directs its antenna in the direction covered by the sector, that is, in the southeast-to-east direction for two-way communication with the base station. The subscriber station doesn't face in the opposite direction, that is, in the northwest-to-west direction. The other subscribers in the sectors covered by each base station direct their antennas in such directions to meet the same requirements.

The radio communication system according to the sixth embodiment of the present invention thus prevents subscriber stations and hence their antennas from facing each other in the same sector, which makes it possible to prevent the occurrence of interference between subscriber stations.

In the cell configuration of FIG. 9, adjacent sectors use different frequencies. Further, all the base-station antennas using the same frequency for communication face in the same direction. For example, in FIG. 9, all the base-station antennas using frequencies F1 and F3 face to the northwest, whereas all the base-station antennas using frequencies F2 and F4 face to the northeast.

In the cell configuration of FIG. 9, no interference between base stations occurs unless adjacent sectors of adjacent base stations use the same frequency. Because no adjacent sectors use the same frequency, no interference between base stations occurs.

The radio communication system according to the sixth embodiment of the present invention can use any combination of frequencies used at each base station as long as the cell configuration prohibits adjacent sectors from using the same frequency, and directs all the base-station antennas using the same frequency in the same direction.

Further, the radio communication system according to the sixth embodiment of the present invention is applicable regardless of the radio communication method, the number of base stations, and the types of frequencies used.

According to the sixth embodiment of the present invention, the radio communication system is such that all the base stations cover the 180-degree area in a certain direction with each cell divided into two or more sectors, their antennas placed to face in the certain direction. Further, the same frequency is reused among all but the base stations in adjacent sectors. Thus, the radio communication system can prevent the occurrence of interference between base stations, and between subscriber stations, thereby offering communication service of higher quality while saving the utilization of frequency resources.

The sixth embodiment of the present invention described the radio communication system in which each cell was divided into two sectors, but the present invention is not limited to the cell division into two sectors. The present invention is, of course, applicable to some number of sectors other than two. If each cell is divided into n sectors (where n is two or more) to provide communication service, it is desirable to use such an antenna as to cover a range of 180/n degrees as an antenna used at each base station.

According to the sixth embodiment of the present invention, the radio communication system may use polarized wave components as components of used frequencies for the purpose of effective utilization of frequency resources. Thus the radio communication system prevents the base stations or the subscriber stations using the same frequency and the same polarized wave from facing each other, which is also effective in a radio system using FDD.

As described above, the radio system according to the present invention prevents the base stations or the subscriber stations using the same frequency and the polarized wave from facing each other. This makes it possible to provide a radio system that can extremely reduce the occurrence of interference in any radio system such as the FDD or TDD system.

The radio system according to the present invention also allows base stations using the same frequency but different polarized waves to be overlapped one upon another in the same region. This makes it possible to provide a radio system that enables additional installation of base stations and effective utilization of frequency resources.

Further, the present invention provides the radio communication system, which divides a certain region into two or more cells and installs a base station for each cell to carry out communication between the base station and many fixed terminal stations in the cell in which the base station is installed, wherein the base station is installed near the edge of the cell, and all the antennas at the base station are made possible communication throughout the same range of the horizontal direction and placed to face in the same direction. This configuration makes it possible to prevent the occurrence of interference between base stations. Further, adjacent cells use different frequencies or different polarized waves for radio communication, which also makes it possible to save the utilization of frequency resources.

Furthermore, the present invention provides the radio communication system wherein each cell is divided into two or more sectors in addition to the features that each base station is installed near the edge of the cell, and all the antennas at the base station made possible communication throughout the same range of the horizontal direction, and placed to face in the same direction. This configuration makes it possible to prevent the occurrence of interference between base stations, and between subscriber stations. Further, adjacent sectors use different frequencies or different polarized waves for radio communication, which also makes it possible to save the utilization of frequency resources.

What is claim is:

1. A radio system that divides a certain region into two or more cells and installs a base station at about the center of each cell to carry out communication between the base station and many fixed terminal stations in the cell in which the base station is installed, wherein each base station uses plural frequencies in each cell, uses the same combination of the frequencies as adjacent base stations, and is divided into three or more sectors, each of which is provided with an antenna different in directivity on a horizontal plane, the antennas are placed in a manner so that the antenna beams cover all the directions on the horizontal plane as a whole, and all the antennas using the same frequency and the same polarized wave are arranged to face in about the same direction in all cells.

2. The radio system according to claim 1, wherein said radio system, which installs base stations to offer service in almost all the parts of the certain region using only one type of polarized wave, further installs base stations using another type of polarized wave in the existing service area.

3. The radio system according to claim 1, wherein the number of sectors at each base station and assignment of frequencies used and polarized waves correspond to those at adjacent base stations.

4. The radio system according to claim 1, wherein said radio system uses a TDD system.

* * * * *